(12) United States Patent
Shinohara et al.

(10) Patent No.: US 7,155,482 B2
(45) Date of Patent: Dec. 26, 2006

(54) METHOD AND DEVICE FOR EXTRACTING DATA FOR ATTACHMENT TO A MAIL MESSAGE

(75) Inventors: Yuji Shinohara, Azuchi-Machi (JP); Toshiya Shirasawa, Azuchi-Machi (JP)

(73) Assignee: Minolta Co., Ltd., Osaka (JP)

( * ) Notice: Subject to any disclaimer, the term of this patent is extended or adjusted under 35 U.S.C. 154(b) by 809 days.

(21) Appl. No.: 09/917,641

(22) Filed: Jul. 31, 2001

(65) Prior Publication Data

US 2002/0046222 A1    Apr. 18, 2002

(30) Foreign Application Priority Data

Aug. 23, 2000    (JP) ............... 2000-253191

(51) Int. Cl.
G06F 15/16 (2006.01)
G06F 17/30 (2006.01)
G06F 15/00 (2006.01)
G06F 7/00 (2006.01)
G06F 17/00 (2006.01)

(52) U.S. Cl. .............. 709/206; 709/207; 707/3; 707/6; 715/503; 715/513; 715/539

(58) Field of Classification Search ........... 709/206, 709/207; 707/3–6, 104.1; 706/48; 715/503, 715/504, 509, 513, 539
See application file for complete search history.

(56) References Cited

U.S. PATENT DOCUMENTS

| | | | | |
|---|---|---|---|---|
| 4,773,009 A | * | 9/1988 | Kucera et al. | 715/531 |
| 5,826,025 A | * | 10/1998 | Gramlich | 709/217 |
| 5,887,133 A | * | 3/1999 | Brown et al. | 709/200 |
| 6,044,395 A | * | 3/2000 | Costales et al. | 709/206 |
| 6,094,649 A | * | 7/2000 | Bowen et al. | 707/3 |
| 6,094,681 A | * | 7/2000 | Shaffer et al. | 709/224 |
| 6,192,396 B1 | * | 2/2001 | Kohler | 709/206 |
| 6,247,045 B1 | * | 6/2001 | Shaw et al. | 709/207 |
| 6,247,066 B1 | * | 6/2001 | Tanaka | 719/320 |
| 6,263,349 B1 | * | 7/2001 | Anderson | 707/205 |
| 6,266,683 B1 | * | 7/2001 | Yehuda et al. | 715/512 |
| 6,269,369 B1 | * | 7/2001 | Robertson | 707/10 |
| 6,347,320 B1 | * | 2/2002 | Christensen et al. | 707/102 |
| 6,370,553 B1 | * | 4/2002 | Edwards et al. | 715/514 |
| 6,381,592 B1 | * | 4/2002 | Reuning | 707/3 |
| 6,381,594 B1 | * | 4/2002 | Eichstaedt et al. | 707/3 |
| 6,397,213 B1 | * | 5/2002 | Cullen et al. | 707/5 |
| 6,401,118 B1 | * | 6/2002 | Thomas | 709/224 |
| 6,421,675 B1 | * | 7/2002 | Ryan et al. | 707/100 |
| 6,421,678 B1 | * | 7/2002 | Smiga et al. | 707/102 |
| 6,430,558 B1 | * | 8/2002 | Delano | 707/5 |
| 6,484,196 B1 | * | 11/2002 | Maurille | 709/206 |

(Continued)

FOREIGN PATENT DOCUMENTS

| | | |
|---|---|---|
| JP | 11-184773 | 7/1999 |
| JP | 11-212884 | 8/1999 |
| JP | 2002063121 A1 * | 2/2002 |

*Primary Examiner*—Jason Cardone
*Assistant Examiner*—Melvin H. Pollack
(74) *Attorney, Agent, or Firm*—Morrison & Foerster LLP

(57) ABSTRACT

An accepting unit accepts one or more HTML files and stores them in a storing unit. A data extracting unit reads each HTML file from the storing unit, detects a keyword corresponding to a receiver in the HTML file, and extracts data that contains the keyword from the HTML file. A data combining unit stores the extracted data to a corresponding buffer in the storing unit, among buffers which have been reserved for multiple receivers. Once the extraction of data from each HTML file has completed for all receivers, a sending unit sends the data stored in the buffers to the corresponding receivers.

17 Claims, 18 Drawing Sheets

U.S. PATENT DOCUMENTS

| | | | | |
|---|---|---|---|---|
| 6,529,942 | B1 * | 3/2003 | Gilbert | 709/206 |
| 6,563,913 | B1 * | 5/2003 | Kaghazian | 379/93.24 |
| 6,581,039 | B1 * | 6/2003 | Marpe et al. | 705/7 |
| 6,594,654 | B1 * | 7/2003 | Salam et al. | 707/3 |
| 6,601,061 | B1 * | 7/2003 | Holt et al. | 707/3 |
| 6,628,306 | B1 * | 9/2003 | Marchionda | 715/752 |
| 6,629,130 | B1 * | 9/2003 | Mertama et al. | 709/206 |
| 6,647,156 | B1 * | 11/2003 | Meding | 382/305 |
| 6,738,760 | B1 * | 5/2004 | Krachman | 707/3 |
| 6,766,362 | B1 * | 7/2004 | Miyasaka et al. | 709/219 |
| 6,772,188 | B1 * | 8/2004 | Cloutier | 709/224 |
| 6,820,237 | B1 * | 11/2004 | Abu-Hakima et al. | 715/531 |
| 6,859,213 | B1 * | 2/2005 | Carter | 715/752 |
| 6,886,130 | B1 * | 4/2005 | Unger et al. | 715/513 |
| 6,938,024 | B1 * | 8/2005 | Horvitz | 706/45 |
| 6,938,203 | B1 * | 8/2005 | Dimarco et al. | 715/513 |
| 7,032,030 | B1 * | 4/2006 | Codignotto | 709/246 |
| 7,062,532 | B1 * | 6/2006 | Sweat et al. | 709/205 |

* cited by examiner

```
<HTML>
<BODY>
```
71 → `<P>`

...

72 → ○○ STAFF : SUBMIT A REPORT ABOUT
○○ TO MANAGER BY NEXT MONTH

73 → `</P>`

`<P>`

74 → ×× STAFF : OBTAIN CONFIRMATION ABOUT
×× BY CUSTOMERS BY NEXT WEEK

75 → `</P>`

`<P>`

76 → △△ STAFF : ANNOUNCE NEW PROPOSITION
ABOUT △△ AT NEXT MEETING

`</P>`

...

`</BODY>`
`</HTML>`

```
<HTML>
<BODY>
<TABLE>
        . . .
<TR>
  <TD> ○○STAFF </TD>
  <TD> 370, 200 </TD>
  <TD> △83, 000 </TD>
</TR>
<TR>
  <TD> ××STAFF </TD>
  <TD> 1, 310, 000 </TD>
  <TD> ▲210, 000 </TD>
</TR>
<TR>
  <TD> △△STAFF </TD>
  <TD> 825, 000 </TD>
  <TD> △25, 000 </TD>
</TR>
        . . .
</TABLE>
        . . .
</BODY>
</HTML>
```

81 → <TABLE>
82 → <TR>
83 → </TR>
84 → <TR>
85 → <TR>
86 → <TD> ○○STAFF </TD>
87 → <TD> ××STAFF </TD>
88 → <TD> △△STAFF </TD>

FIG.9

| ○○STAFF | 370,200 | △83,000 |
|---|---|---|
| ××STAFF | 1,310,000 | ▲210,000 |
| △△STAFF | 825,000 | △25,000 |

METHOD AND DEVICE FOR EXTRACTING DATA FOR ATTACHMENT TO A MAIL MESSAGE

This application is based on application No. 2000-253191 filed in Japan, the content of which is hereby incorporated by reference.

BACKGROUND OF THE INVENTION

1. Field of the Invention

The present invention relates to a data processing method, program, and device that extract data to be attached to an e-mail message from a given file, for each receiver.

2. Related Art

In an electronic mail (e-mail) system, the same data can be delivered to multiple receivers, just by listing mail addresses of the receivers and attaching a file containing the data to the message body. For this advantage, data delivery by e-mail is widely used nowadays, and various improvements are being made for data delivery methods.

For instance, an e-mail transmission device disclosed by Japanese Laid-Open Patent Application No. H11-212884 accepts an indication of an address field, and attaches a file only to an e-mail message to be sent to receivers included in the indicated address field. In this way, the file attached to the e-mail message is sent only to the receivers who need to receive the file.

However, since this e-mail transmission device attaches the whole file to the e-mail message, each receiver has to search the received file for parts which he or she needs. Especially when the attached file is large and the necessary parts are scattered in the file, it takes time to find those necessary parts.

SUMMARY OF THE INVENTION

Hence the object of the present invention is to provide a data processing method, program, and device that are capable of extracting necessary parts of electronic files for each receiver and sending the extracted data to the receiver, in data delivery by e-mail.

The stated object can be achieved by a data processing method including: a keyword accepting step for accepting a keyword; a document file accepting step for accepting a document file; a data extracting step for extracting data corresponding to the keyword, from the document file; and a data attaching step for attaching the extracted data to an e-mail message.

With this construction, only the necessary data is delivered to each individual receiver, so that the receiver is saved from having to find data which is relevant to him or her, from an attached file that also contains irrelevant data.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 7 shows an example HTML file accepted by the attached file editing software;

FIG. 8 shows another example HTML file accepted by the attached file editing software;

FIG. 9 shows part of a display of the HTML file shown in FIG. 8, by a browser;

DESCRIPTION OF THE PREFERRED EMBODIMENT

Figure 1:
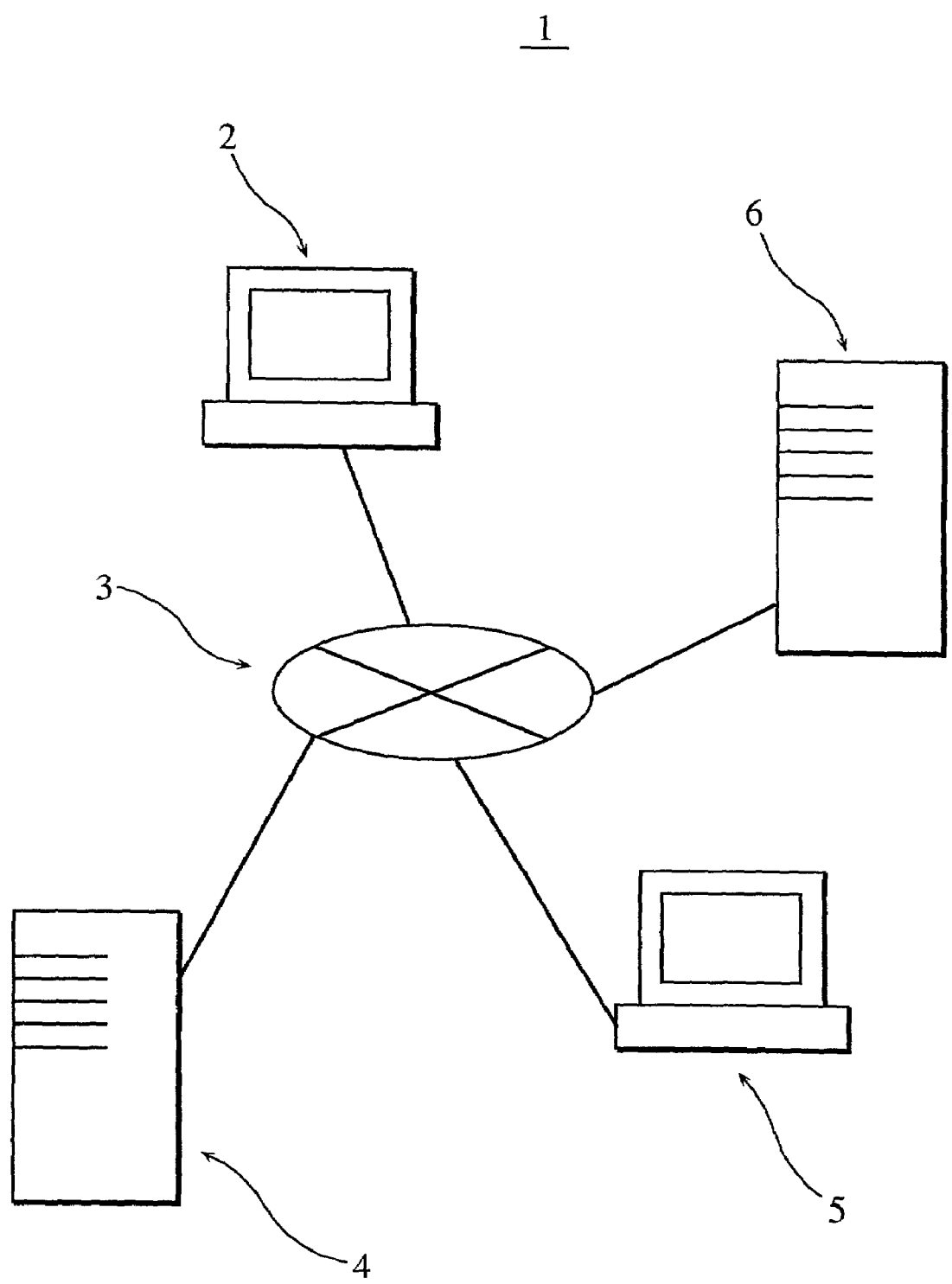
FIG. 1 shows a construction of a mail delivery system to which an embodiment of the invention relates.

The following describes an embodiment of the invention, by referring to the drawings.

FIG. 1 shows a construction of an e-mail delivery system 1 that includes a PC (personal computer) 2 on which attached file editing software of the embodiment is installed. In the e-mail delivery system 1, the PC 2 sends/receives e-mail messages to/from an e-mail terminal 5, via e-mail servers 4 and 6 connected to a communication network 3. The PC 2 acquires e-mail messages from the mail server 6, in accordance with POP (Post Office Protocol). Likewise, the e-mail terminal 5 acquires e-mail messages from the mail server 4, in accordance with POP. The mail servers 4 and 6 transfer e-mail messages with each other, in accordance with SMTP (Simple Mail Transfer Protocol).

Figure 2:
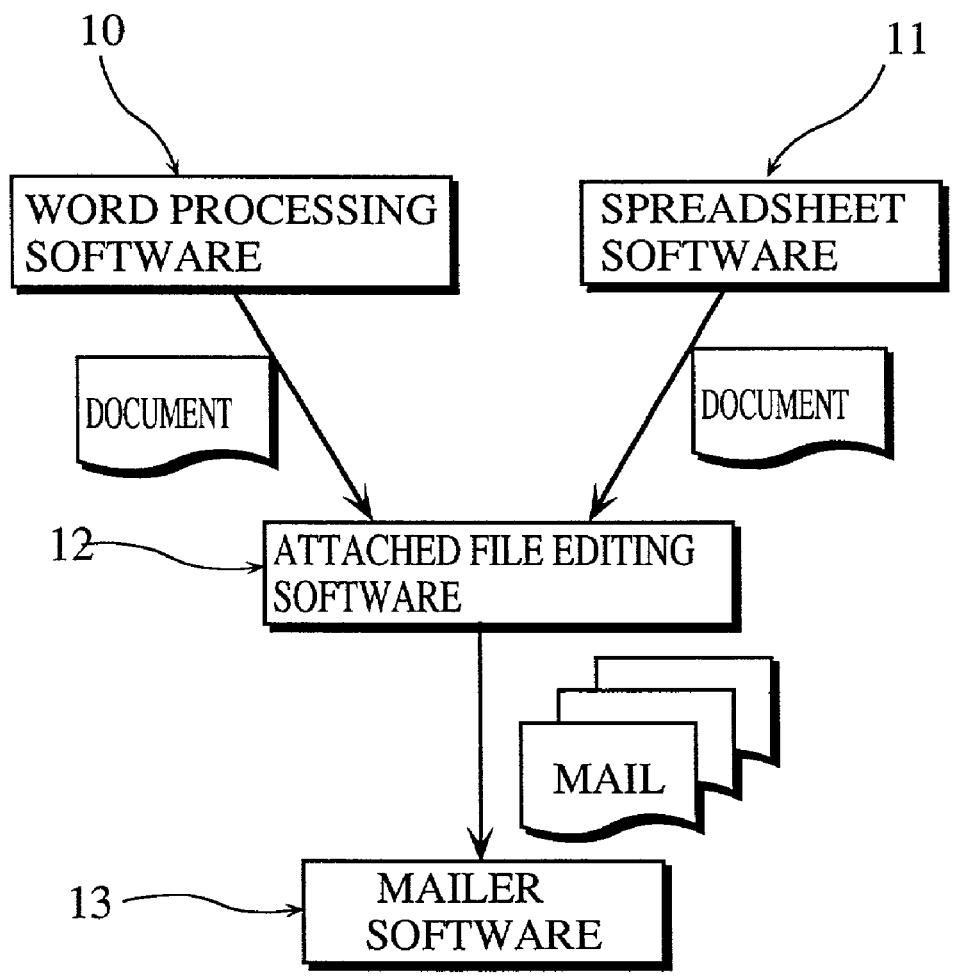
FIG. 2 shows a construction of software installed in a PC shown in FIG. 1.

FIG. 2 shows a construction of software installed in the PC 2. The PC 2 includes word processing software 10 and spreadsheet software 11 for generating documents. Documents generated using these software are held as HTML (hypertext markup language) files (hereafter simply referred to as "files"). If the word processing software 10 or the spreadsheet software 11 generates documents of a file format other than HTML, the generated documents may then be converted to HTML documents.

The PC 2 also includes attached file editing software 12. The attached file editing software 12 extracts data that is relevant to an indicated receiver, from an indicated file. The attached file editing software 12 then attaches the extracted data to an e-mail message, and has mailer software 13 send the e-mail message. The detailed processing of the attached file editing software 12 will be explained later. The mailer software 13 sends the e-mail message to the mail server 6, according to SMTP.

Figure 3:
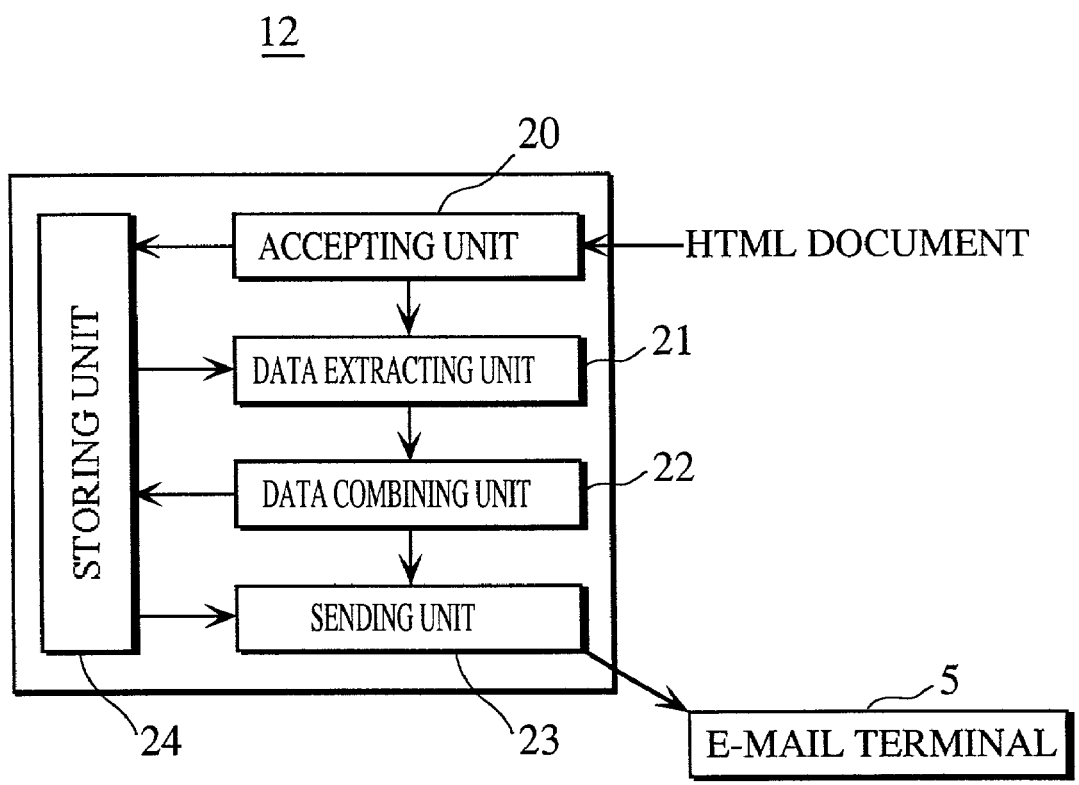
FIG. 3 shows a functional construction of attached file editing software shown in FIG. 2.

FIG. 3 shows a functional construction of the attached file editing software 12. The attached file editing software 12 is roughly made up of an accepting unit 20, a data extracting unit 21, a data combining unit 22, a sending unit 23, and a storing unit 24. The accepting unit 20 accepts a file and stores it to the storing unit 24. The data extracting unit 21 reads the file from the storing unit 24, and searches the file for a character string (keyword) corresponding to each receiver. The data extracting unit 21 extracts data that contains the keyword.

The data combining unit 22 reserves a buffer in the storing unit 24, for the receiver. The data combining unit 22 stores the extracted data to the buffer. The sending unit 23 sends the data stored in the buffer, to the receiver. Here, the data is sent in HTML format.

The flow of processing by the attached file editing software 12 is explained below, with reference to GUIs (graphical user interfaces).

Figure 4:
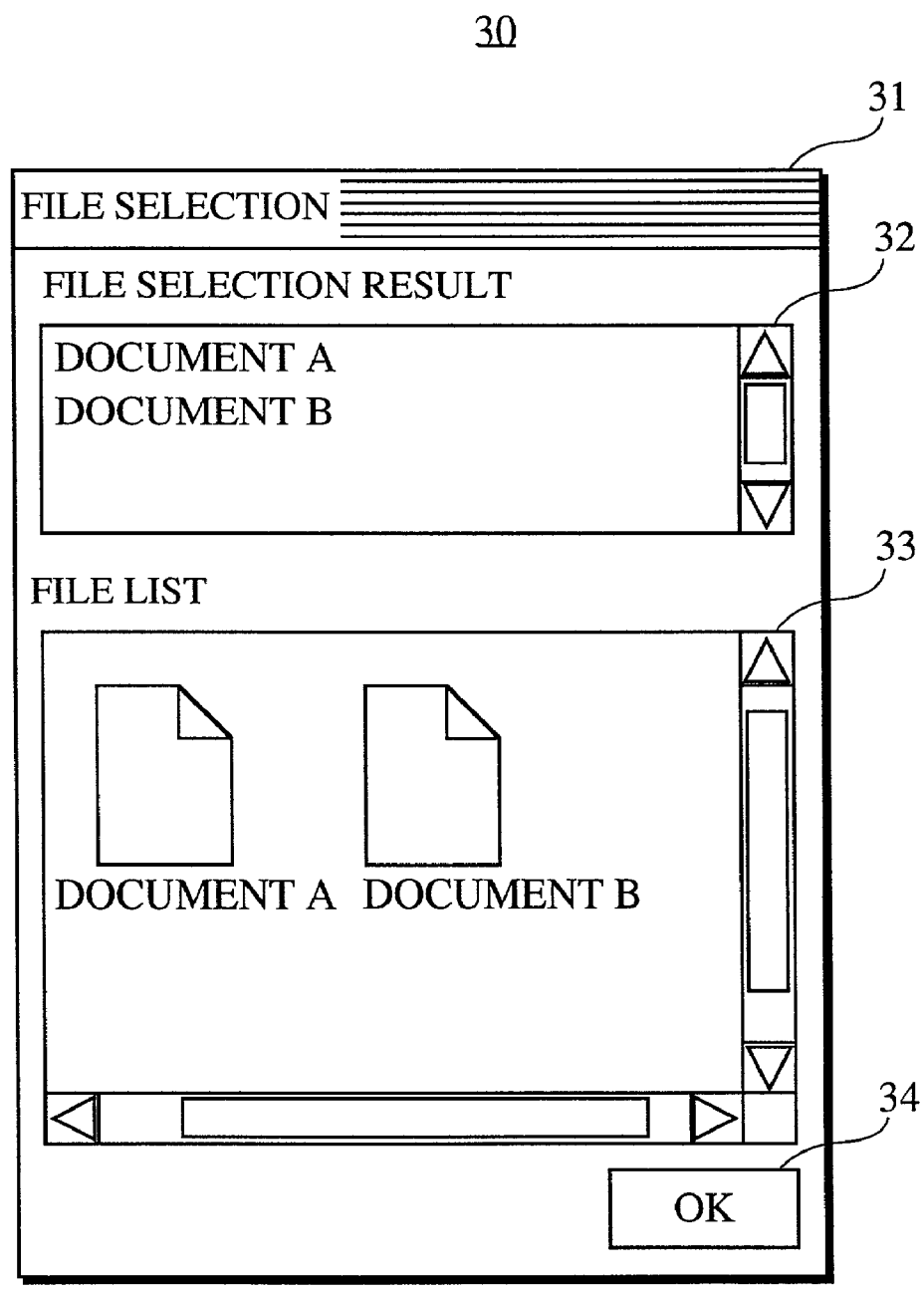
FIG. 4 shows a file selection window of the attached file editing software.

FIG. 4 shows a file selection window 30 which is first displayed when the attached file editing software 12 is started. The file selection window 30 is roughly made up of a title bar 31, a file selection result subwindow 32, a file list subwindow 33, and an OK button 34. A character string "FILE SELECTION" indicating the file selection window 30 is displayed on the title bar 31.

Among icons of files displayed in the file list subwindow 33, the user drags an icon of a file to be attached to an e-mail message, and drops it to the file selection result subwindow 32. As a result, the filename of the file to be attached is displayed in the file selection result subwindow 32. Having selected all files to be attached to the e-mail message, the user clicks on the OK button 34 to end the file selection.

Figure 5:
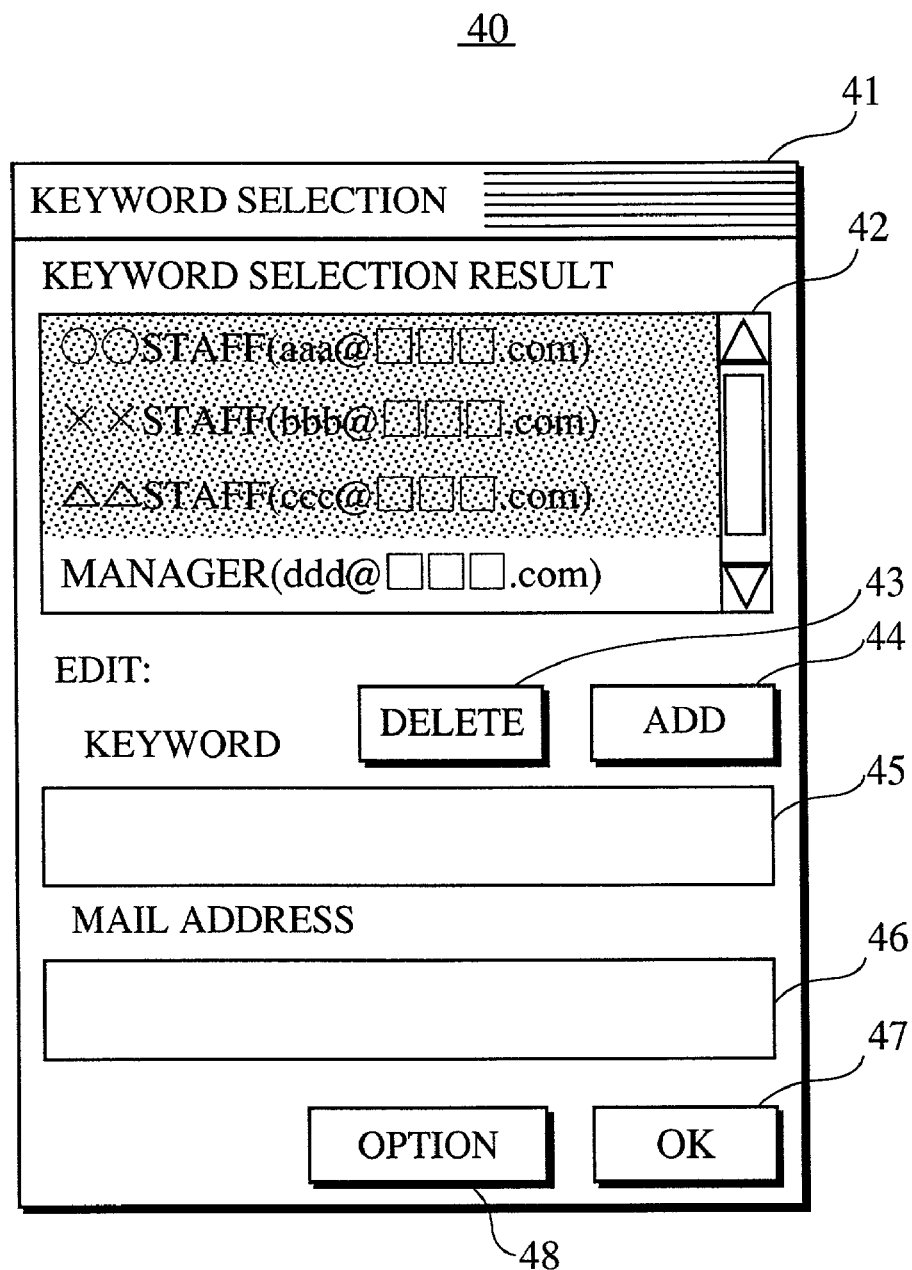
FIG. 5 shows a keyword selection window of the attached file editing software.

When the user clicks on the OK button 34, a keyword selection window 40 shown in FIG. 5 is displayed. The keyword selection window 40 includes a title bar 41, a keyword selection result subwindow 42, a keyword input subwindow 45, and a mail address input subwindow 46. A character string "KEYWORD SELECTION" indicating the keyword selection window 40 is displayed on the title bar 41.

In the keyword selection window 40, the keyword input subwindow 45 is a window for accepting an input of a keyword, whereas the mail address input subwindow 46 is a window for accepting an input of a mail address corresponding to the input keyword. When an ADD button 44 is clicked, the keyword inputted in the keyword input subwindow 45 is displayed in shade in the keyword selection result subwindow 42, with the mail address inputted in the mail address input subwindow 46 being displayed in parentheses alongside. These keyword and mail address are stored in a keyword storing table managed by the attached file editing software 12. In this embodiment, shaded display of a keyword in the keyword selection result subwindow 42 denotes that the keyword is selected.

When the keyword selection window 40 is opened, all keywords stored in the keyword storing table are displayed in the keyword selection result subwindow 42 without shade. If an unshaded keyword in the keyword selection result subwindow 42 is clicked, that keyword is selected and becomes shaded. If a shaded keyboard in the keyword selection result subwindow 42 is clicked, that keyword is deselected and becomes unshaded.

When a DELETE button 43 is clicked, all shaded keywords in the keyword selection result subwindow 42 are deleted from the keyword storing table. When an OPTION button 48 is clicked, a data extraction condition setting window is displayed. The data extraction condition setting window is a window for setting conditions of extracting data from the files selected in the file selection window 30, for each keyword.

Figure 6:
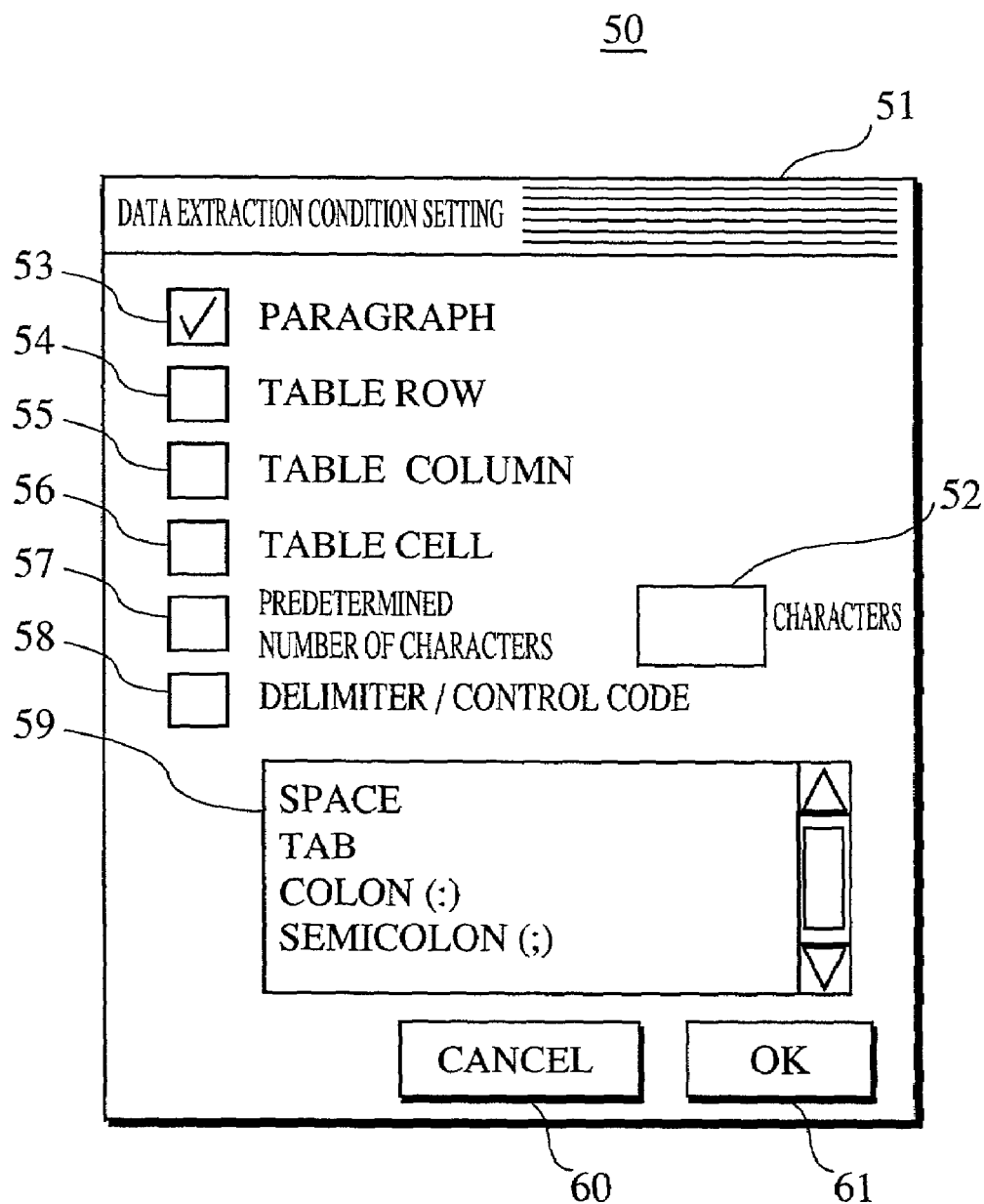
FIG. 6 shows a data extraction condition setting window of the attached file editing software.

FIG. 6 shows a data extraction condition setting window 50 displayed when the OPTION button 48 is clicked. The data extraction condition setting window 50 includes a title bar 51, check boxes 53–58, and a subwindow 59. A character string "DATA EXTRACTION CONDITION SETTING" indicating the data extraction condition setting window 50 is displayed on the title bar 51. When any of the check boxes 53–58 is checked, a data extraction condition corresponding to the check box is set.

The check box 53 sets a condition of extracting a paragraph that contains a keyword selected in the keyword selection window 40, from a file selected in the file selection window 30. When the check box 53 is checked, the attached file editing software 12 searches the file for the paragraph containing the keyword.

The check boxes 54–56 sets data extraction conditions relating to a table in the file. To be more specific, when the check box 54 is checked, a condition of extracting a table row containing the keyword is set. When the check box 55 is checked, a condition of extracting a table column containing the keyword is set. When the check box 56 is checked, a condition of extracting a table cell containing the keyword is set.

When the check box 57 is checked, a condition of extracting a character string which begins with the keyword and is made up of the number of characters specified in a text box 52 is set. In this way, a sentence that has the keyword as a subject can be extracted. When the check box 58 is checked, a condition of extracting a character string which contains the keyword and is sandwiched between control characters selected in the subwindow 59 is set. Here, when a name of a control character is clicked in the subwindow 59, that control character is selected and becomes shaded in the subwindow 59. When the shaded control character is clicked, the control character is deselected and becomes unshaded.

When an OK button 61 is clicked, the condition setting according to the check boxes 53–58 takes effect. When a CANCEL button 60 is clicked, the condition setting according to the check boxes 53–58 is canceled.

FIG. 7 shows a file 70 as an example file accepted by the attached file editing software 12. The file 70 shows part of the minutes of a meeting. In the file 70, a portion (i.e. a paragraph) from a paragraph start tag <P> (hereafter "<P> tag") 71 to a paragraph end tag </P> (hereafter "</P> tag") 72, a paragraph from a <P> tag 73 to a </P> tag 74, and a paragraph from a <P> tag 75 to a </P> tag 76 respectively relate to business schedules of persons in charge of ◯◯, xx , and △△ (hereinafter called "◯◯ staff", "xx staff", and "△△ staff").

If the check box 53 in the data extraction condition setting window 50 is checked, the attached file editing software 12 extracts a paragraph that contains a keyword and begins with a <P> tag and ends with a </P> tag, from the file. For example, if the keyword is "xx staff", the paragraph from the <P> tag 73 to the </P> tag 74 is extracted. If the keyword is "ΔΔ staff", the paragraph from the <P> tag 75 to the </P> tag 76 is extracted.

FIG. 8 shows a file 80 as another example file accepted by the attached file editing window 12. This file 80 includes a table listing the expenses spent by the ○○, xx , and ΔΔ staff. FIG. 9 shows this table displayed by a browser. If the check box 54 is checked, the attached file editing software 12 extracts a portion (i.e. a row) beginning with a table row start tag <R> (hereafter "<TR> tag") and ending with a table row end tag </TR> (hereafter "</TR> tag"). When the keyword is "○○ staff", for instance, a row from a <TR> tag 81 to a </TR> tag 83 is extracted.

If the check box 55 is checked, the attached file editing software 12 extracts, for each row, a portion (i.e. a cell) that begins with a table data cell start tag <TD> (hereafter "<TD> tag") and ends with a table data cell end tag </TD> (hereafter "</TD> tag"). For example, when the keyword is "○○ staff", a cell beginning with a <TD> tag 82 and ending with a </TD> tag 86, a cell beginning with a <TD> tag 84 and ending with a </TD> tag 87, and a cell beginning with a <TD> tag 85 and ending with a </TD> tag 88 are extracted and set together as a column.

If the check box 56 is checked, on the other hand, the attached file editing software 12 extracts each cell that contains the keyword.

Figure 10:
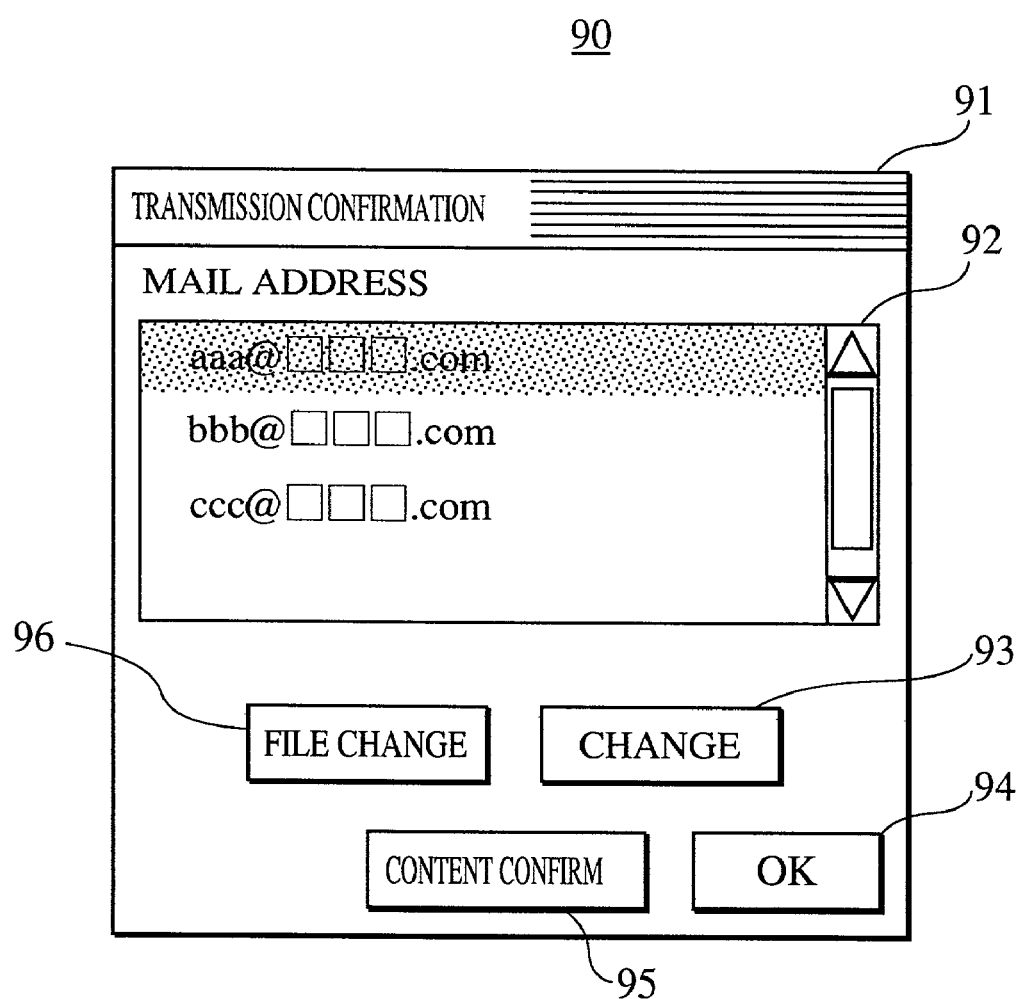
FIG. 10 shows a transmission confirmation window of the attached file editing software.

When the OK button 47 is clicked in the keyword selection window 40, a transmission confirmation window 90 shown in FIG. 10 is displayed. The transmission confirmation window 90 includes a title bar 91 and a mail address subwindow 92. A character string "TRANSMISSION CONFIRMATION" indicating the transmission confirmation window 90 is displayed on the title bar 91. Also, the mail addresses corresponding to the keywords selected in the keyword selection window 40 are displayed in the mail address subwindow 92.

When a CHANGE button 93 is clicked in the transmission confirmation window 90, the keyword selection window 40 is displayed, allowing the user to add or delete keywords and mail addresses.

When a FILE CHANGE button 96 is clicked in the transmission confirmation window 90, the file selection window 30 is displayed, allowing the user to reselect files.

When a CONTENT CONFIRM button 95 is clicked, the contents of an e-mail message to be sent to a mail address shaded in the mail address subwindow 92 are displayed. This allows the user to check the contents of the e-mail message. Note here that only one mail address is shaded in the mail address subwindow 92 at one time.

When an OK button 94 is clicked, corresponding e-mail messages are sent to the mail addresses displayed in the mail address subwindow 92.

Figure 11:
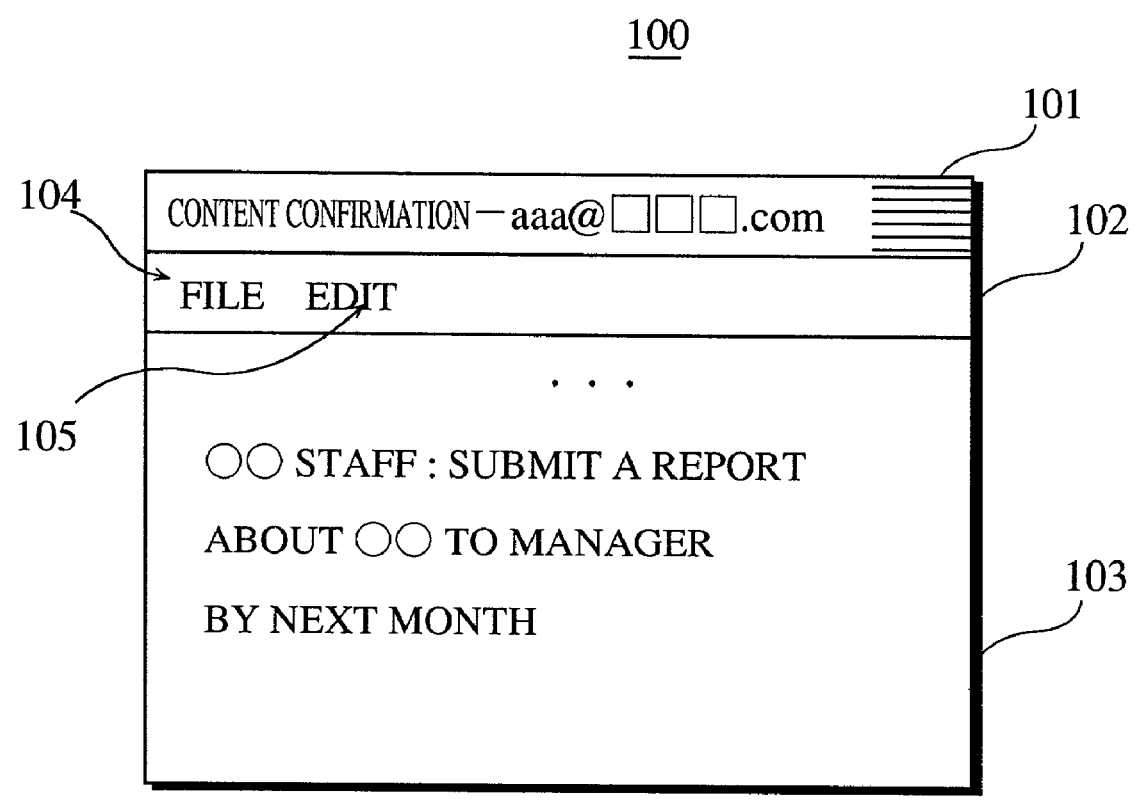
FIG. 11 shows a content confirmation window of the attached file editing software.

FIG. 11 shows a content confirmation window 100 displayed when the CONTENT CONFIRM button 95 is clicked. The content confirmation window 100 includes a title bar 101, a menu bar 102, and an edit box 103. A character string "CONTENT CONFIRMATION" indicating the content confirmation window 100 is displayed on the title bar 101, with the mail address of the e-mail message subjected to the content confirmation being displayed alongside.

The edit box 103 displays the e-mail message, and accepts editing operations for the e-mail message.

The menu bar 102 includes a FILE button 104 and an EDIT button 105. When the FILE button 104 is clicked, a pull-down menu showing the filenames of the files selected in the file selection window 30 is displayed. When one of the filenames is clicked, the corresponding file is displayed in another window. This allows the user to edit the e-mail message by, for example, copying the file displayed in the other window and pasting it to the edit box 103. The pull-down menu also has an END button. When the END button is clicked, the content confirmation window 100 is closed.

When the EDIT button 105 is clicked, a pull-down menu having various buttons such as "COPY", "PASTE", "DELETE", and "SEARCH" is displayed, providing necessary functions for file editing.

This completes an explanation of the GUIs and accompanying processes of the attached file editing software 12. The following describes operations of the attached file editing software 12 corresponding to the windows 30, 40, 50, 90, and 100, by referring to flowcharts.

Figure 12:
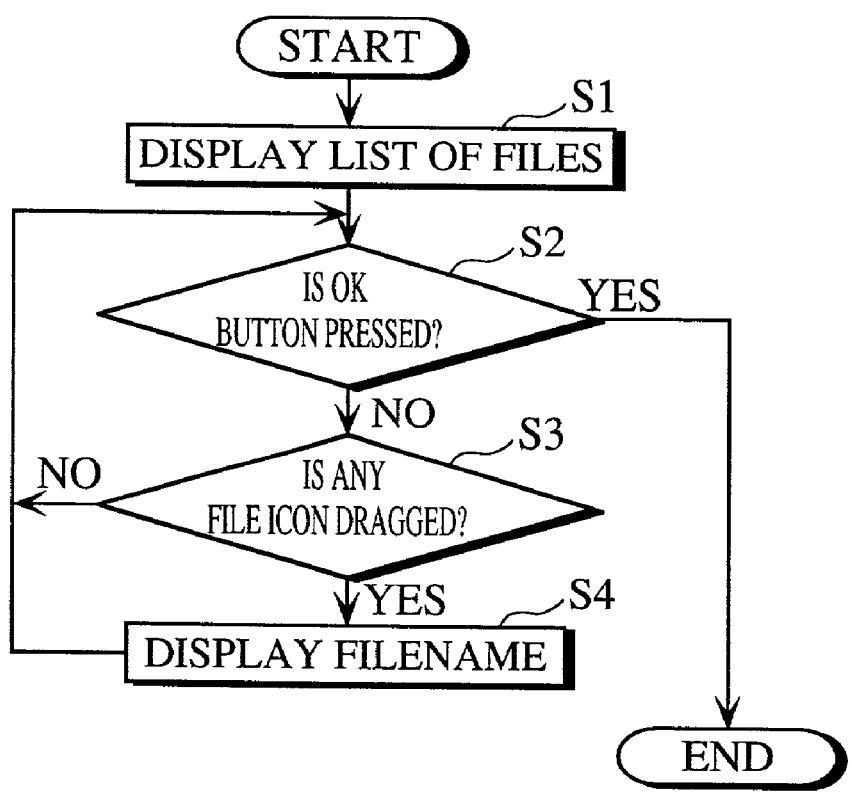
FIG. 12 is a flowchart showing an operation of the attached file editing software corresponding to the file selection window.

FIG. 12 is a flowchart showing an operation of the attached file editing software 12 corresponding to the file selection window 30. On startup, the attached file editing software 12 displays the file selection window 30, and displays a list of files in the file list subwindow 33 (S1).

The attached file editing software 12 then judges whether the OK button 34 is pressed (S2). If the OK button 34 is not pressed, the attached file editing software 12 judges whether any file icon displayed in the file list subwindow 33 has been dragged to the file selection result subwindow 32 (S3). If any file icon has been dragged, the attached file editing software 12 displays a filename of the dragged file in the file selection result subwindow 32 (S4), and returns to step S2. If no file icon has been dragged, the attached file editing software 12 returns to step S2. When the OK button 34 is pressed in step S2, the attached file editing software 12 closes the file selection window 30 and opens the keyword selection window 40.

Figure 13:
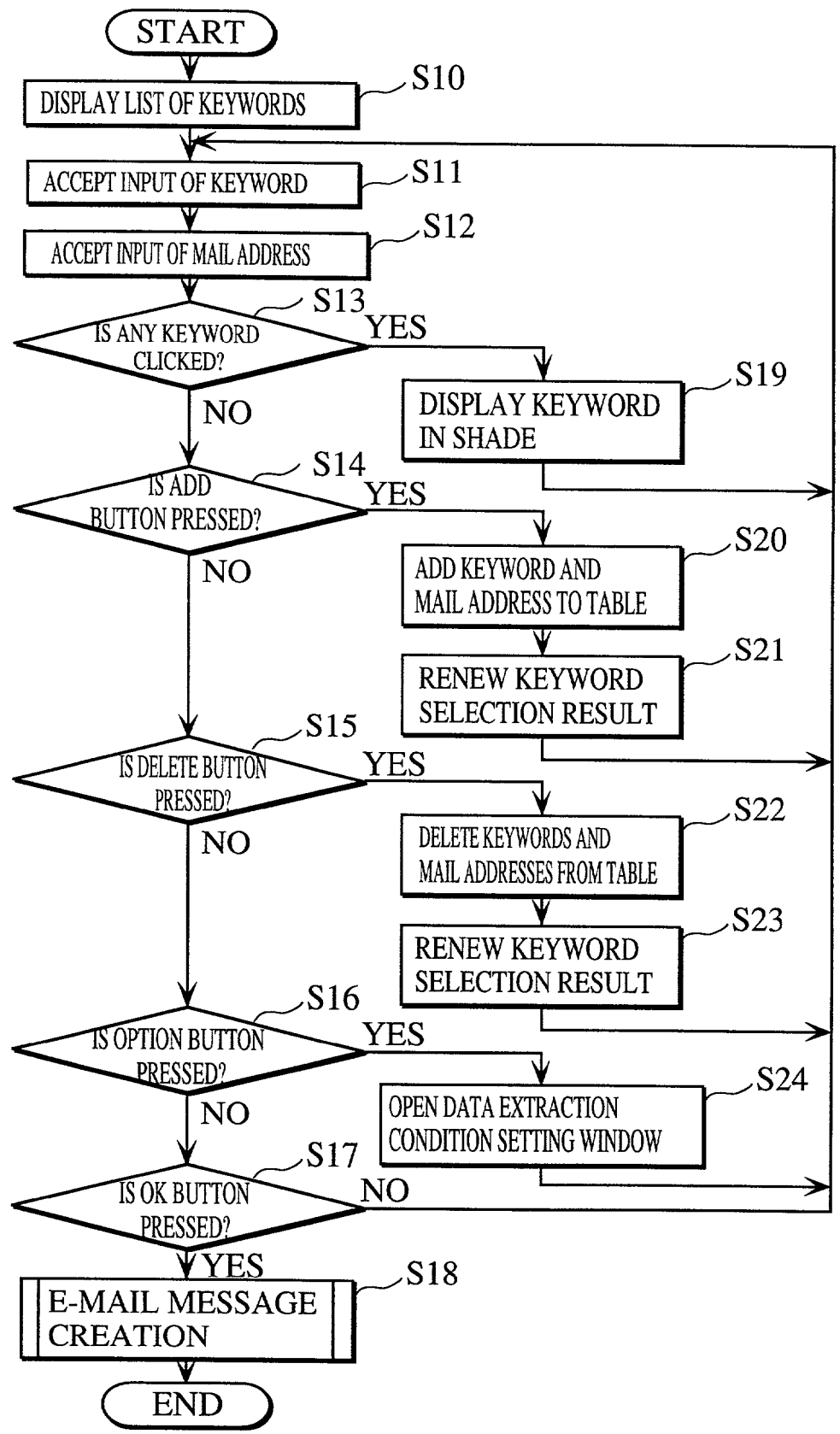
FIG. 13 is a flowchart showing an operation of the attached file editing software corresponding to the keyword selection window.

FIG. 13 is a flowchart showing an operation of the attached file editing software 12 corresponding to the keyword selection window 40. Upon opening the keyword selection window 40, the attached file editing software 12 searches the keyword storing table from top to bottom, and displays keywords and corresponding mail addresses in the keyword selection result subwindow 42 (S10). Here, the keywords and the mail addresses are unshaded.

The attached file editing software 12 then accepts a keyword inputted in the keyword input subwindow 45, and stores it to a temporary buffer (S11). The attached file editing software 12 also accepts a mail address inputted in the mail address input subwindow 46, and stores it to the temporary buffer (S12). If a keyword displayed in the keyword selection result subwindow 42 is clicked (S13), the attached file editing software 12 changes the display of the clicked keyword to shaded display (S19).

If no keyword is clicked in step S13, the attached file editing software 12 judges whether the ADD button 44 is pressed (S14). If the ADD button 44 is pressed, the attached file editing software 12 adds the keyword inputted in the keyword input subwindow 45 and the mail address inputted in the mail address input subwindow 46, to the keyword storing table (S20). The attached file editing software 12 then displays the added keyword and mail address in shade in the keyword selection result subwindow 42 (S21).

If the ADD button 44 is not pressed in step S14 and the DELETE button 43 is pressed (S15), the attached file editing software 12 deletes all keywords and mail addresses which are shaded in the keyword selection result subwindow 42, from the keyword storing table (S22) If the DELETE button 43 is not pressed in step S15 and the OPTION button 48 is pressed (S16), the attached file editing software 12 opens the data extraction condition setting window 50 (S24).

If the OPTION button 48 is not pressed in step S16, the attached file editing software 12 judges whether the OK button 47 is pressed (S17). If the OK button 47 is pressed, the attached file editing software 12 creates e-mail messages (S18), closes the keyword selection window 40, and opens the transmission confirmation window 90. If the judgement "NO" is given in step S17, or after any of steps S19, S21, S23, and S24, the operation returns to step S11.

Figure 14:
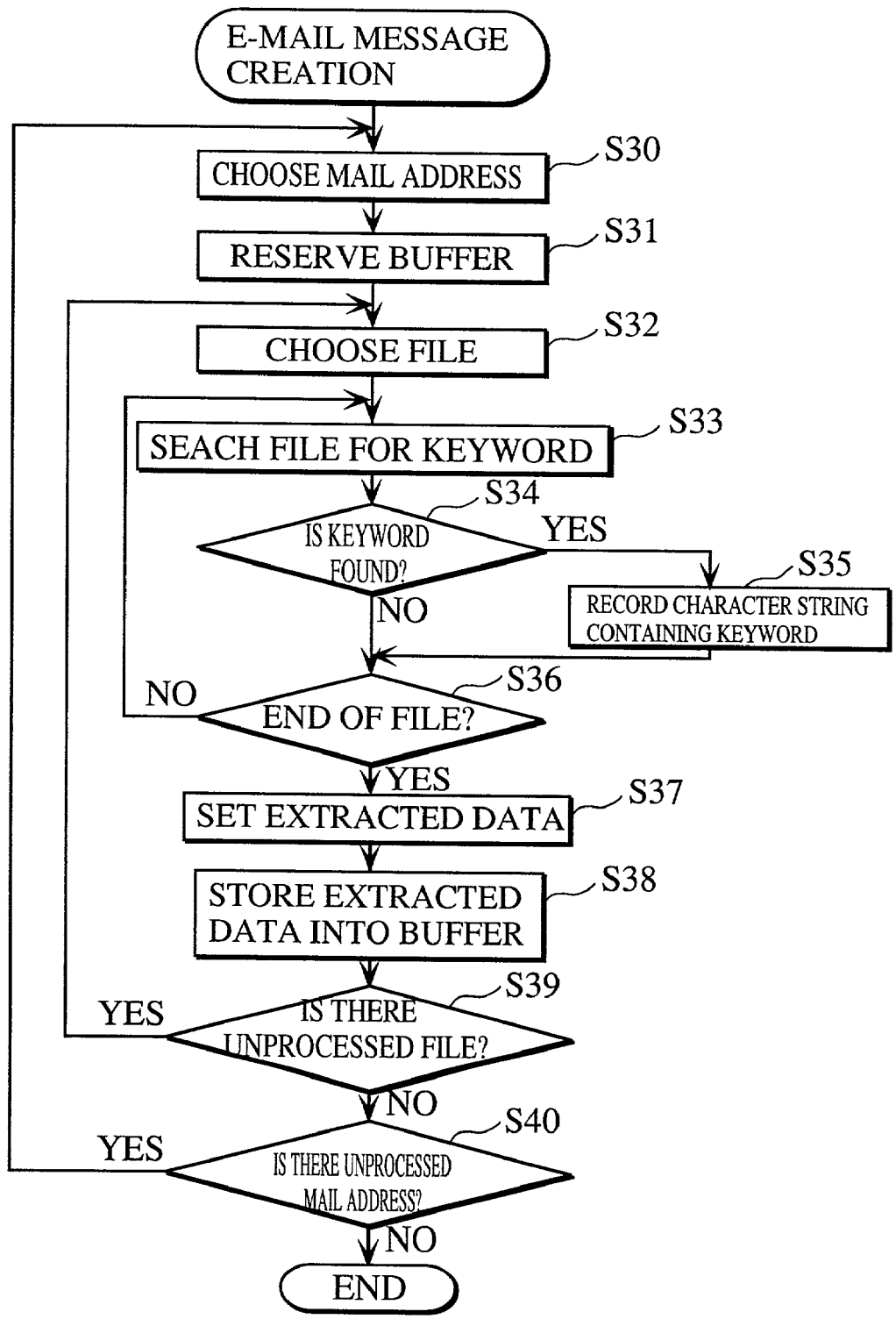
FIG. 14 is a flowchart showing an e-mail creation procedure of step S18 in FIG. 13, in greater detail.

FIG. 14 is a flowchart showing the detail of the e-mail message creation procedure of step S18 in FIG. 13. In the e-mail message creation procedure, the attached file editing software 12 chooses one of the mail addresses corresponding to the keywords selected in the keyword selection window 40 (S30), and reserves a buffer for storing an e-mail message to be sent to the chosen mail address, in the storing unit 24 (S31). The attached file editing software 12 then chooses one of the files selected in the file selection window 30 (S32), and searches the chosen file for the keyword corresponding to the chosen mail address (S33). If the keyword is found (S34), the attached file editing software 12 records a predetermined character string that contains the keyword (S35).

The predetermined character string referred to here is a character string which contains the keyword and corresponds to the largest unit specified by the conditions set in the data extraction condition setting window 50. Suppose the check boxes 53 and 57 are checked in the data extraction condition setting window 50, with the number of characters for the latter being specified as "100". In this case, having detected the keyword "xx staff" in the file 70 shown in FIG. 7, the attached file editing software 12 compares the character string defined by the condition of the checkbox 53 (the character string from the <P> tag 73 to the </P> tag 74), with the character string defined by the condition of the check box 57 (the character string of 100 characters beginning with the keyword "xx staff"). The attached file editing software 12 chooses the larger character string as the predetermined character string.

If the judgement "NO" is given in step S34, or after step S35, the attached file editing software 12 checks whether the end of the file (EOF) has been reached (S36). If the EOF has not been reached, the operation returns to step S33. If the EOF has been reached, the attached file editing software 12 takes the sum of all character strings recorded in step S35, and sets the outcome as data to be extracted (S37). The attached file editing software 12 stores the data into the buffer (S38) After this, if there is any unprocessed file (S39), the operation returns to step S32. Otherwise, the operation proceeds to step S40 to judge whether there is any unprocessed mail address (S40). If there is an unprocessed mail address, the operation returns to step S30. If not, the e-mail creation procedure is complete.

Figure 15:
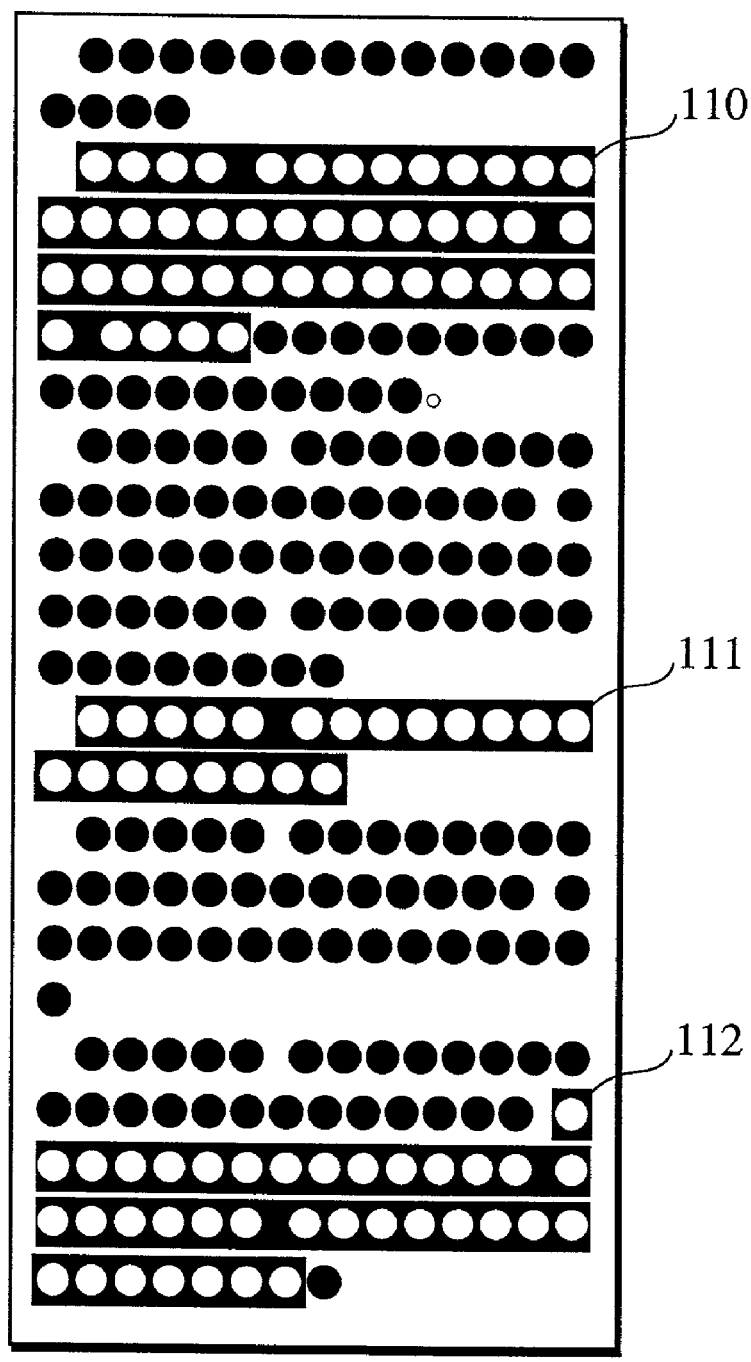
FIG. 15 shows an example of a file processed by the attached file editing software.

FIG. 15 shows an example file processed by the attached file editing software 12. In the drawing, the attached file editing software 12 takes the sum of character strings 110, 111, and 112 which are recorded in step S35, and sets the result as data to be extracted. Though the character strings 110–112 do not overlap in FIG. 15, if the same keyword is included in a single paragraph more than once, character strings defined by these inclusions may overlap one another. In such a case, the sum of the character strings is taken in step S37, so that no overlapping data is stored in the buffer.

Figure 16:
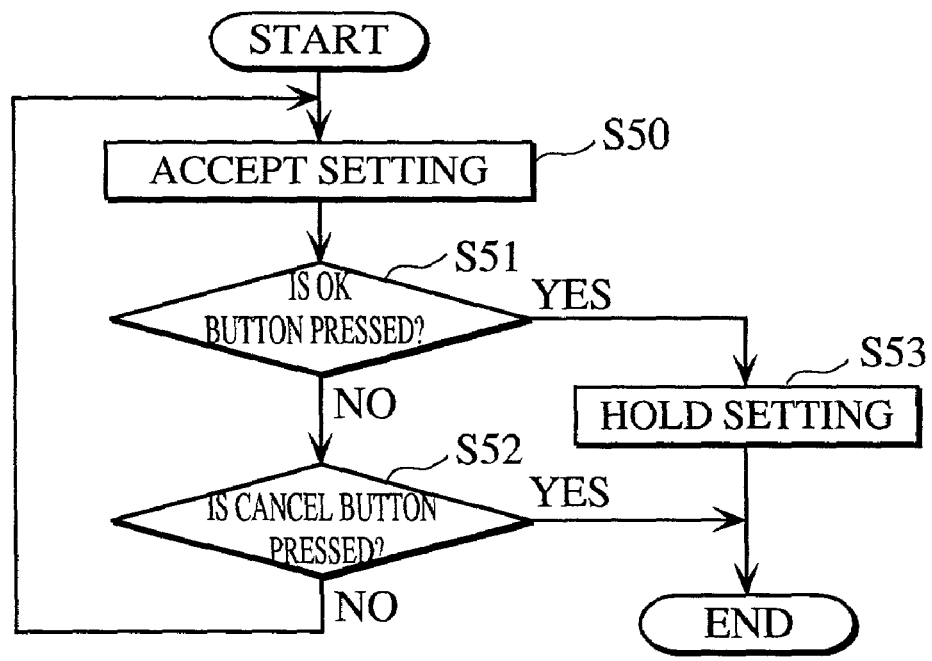
FIG. 16 is a flowchart showing an operation of the attached file editing software corresponding to the data extraction condition setting window.

FIG. 16 is a flowchart showing an operation of the attached file editing software 12 corresponding to the data extraction condition setting window 50. Upon opening the data extraction condition setting window 50, the attached file editing software 12 accepts inputs of condition setting (S50), and stores the contents of the setting into a temporary buffer. When the OK button 61 is pressed (S51), the attached file editing software 12 reads the contents from the temporary buffer, and stores them to a setting table (S53).

The attached file editing software 12 performs subsequent operations (described later), in accordance with the contents of the setting stored in the setting table. When the OK button 61 is not pressed in step S51 and the CANCEL button 60 is not pressed (S52), the attached file editing software 12 returns to step S50. If the CANCEL button 60 is pressed in step S52, or after step S53, the attached file editing software 12 closes the data extraction condition setting window 50 and proceeds to step S11 in FIG. 13.

Figure 17:
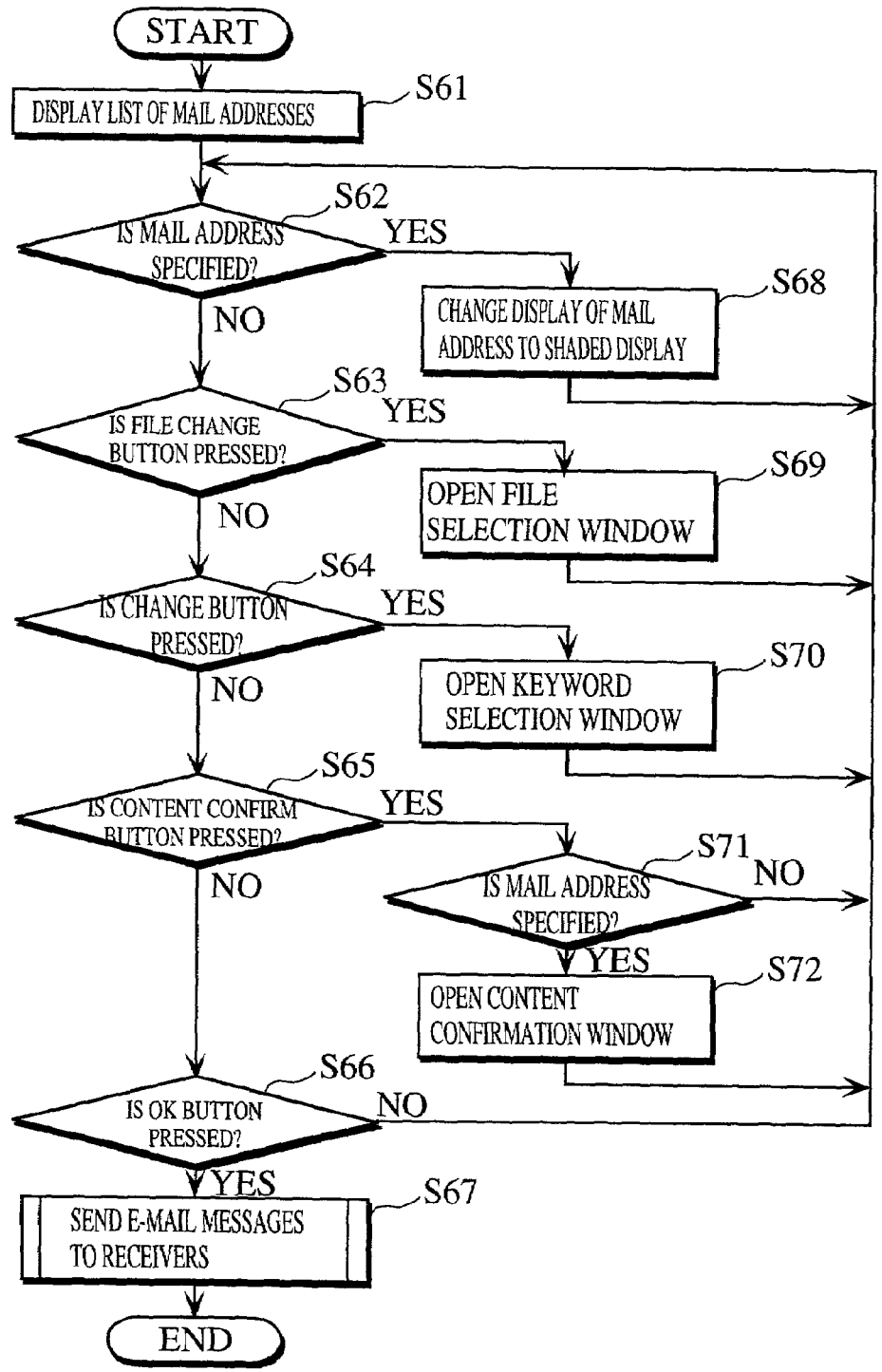
FIG. 17 is a flowchart showing an operation of the attached file editing software corresponding to the transmission confirmation window.

FIG. 17 is a flowchart showing an operation of the attached file editing software 12 corresponding to the transmission confirmation window 90. Upon opening the transmission confirmation window 90, the attached file editing software 12 displays the list of the mail addresses corresponding to the keywords selected in the keyword selection window 40, in the mail address subwindow 92 (S61). When any of the mail addresses is clicked in the mail address subwindow 92 (S62), the attached file editing software 12 changes the display of the clicked mail address to shaded display (S68). Here, only one keyword is shaded at a time and the other keywords are unshaded in the mail address subwindow 92.

If no mail address is clicked in step S62, the attached file editing software 12 judges whether the FILE CHANGE button 96 is pressed (S63). If the FILE CHANGE button 96 is pressed, the attached file editing software 12 opens the file selection window 30 (S69). Otherwise, the attached file editing software 12 judges whether the CHANGE button 93 is pressed (S64). If the CHANGE button 93 is pressed, the attached file editing software 12 opens the keyword selection window 40 (S70).

If the CHANGE button 93 is not pressed in step S64, the attached file editing software 12 judges whether the CONTENT CONFIRM button 95 is pressed (S65). If the CONTENT CONFIRM button 95 is pressed, the attached file editing software 12 judges whether any of the mail addresses displayed in the mail address subwindow 92 is shaded (S71). If so, the attached file editing software 12 opens the content confirmation window 100. If the CONTENT CONFIRM button 95 is not pressed in step S65 and the OK button 94 is pressed (S66), the attached file editing software 12 sends the created e-mail messages to the corresponding receivers (S67). If the judgement "NO" is given in step S66 or step S71, or after any of steps S68, S69, S70, and S72, the operation returns to step S62.

Figure 18:
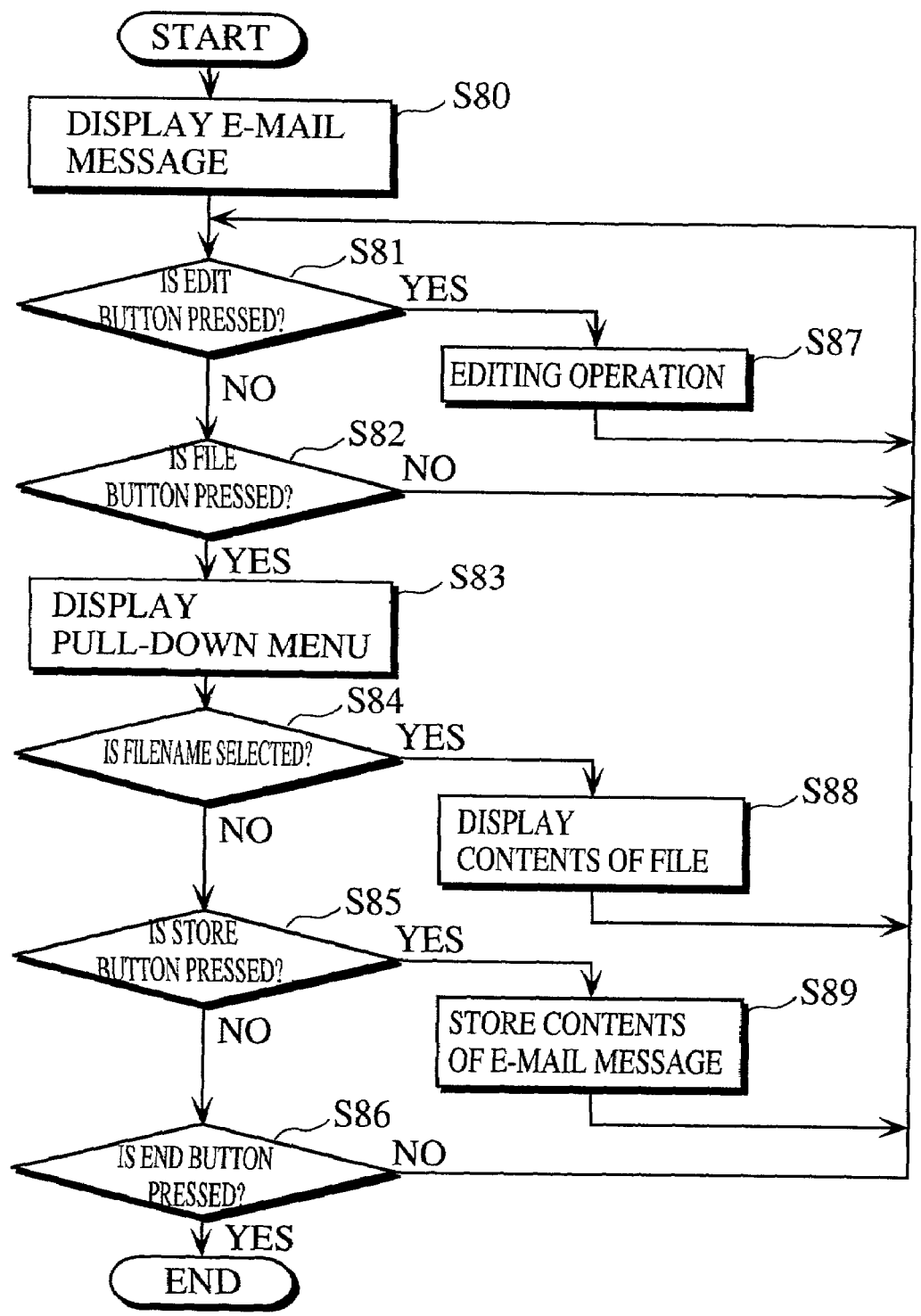
FIG. 18 is a flowchart showing an operation of the attached file editing software corresponding to the content confirmation window.

FIG. 18 is a flowchart showing an operation of the attached file editing software 12 corresponding to the content confirmation window 100. Upon opening the content confirmation window 100, the attached file editing software 12 displays the contents of the e-mail message to be sent to the mail address selected in the transmission confirmation window 90, in the edit box 103 (S80). When the EDIT button 105 on the menu bar 102 is pressed (S81), the attached file editing software 12 performs editing (S87). Which is to say, the attached file editing software 12 displays the pull-down menu including the COPY and other buttons, and executes editing operations according to inputs of these buttons.

If the EDIT button 105 is not pressed in step S81 and the FILE button 104 is pressed (S82), the attached file editing software 12 displays the pull-down menu showing the filenames of the files selected in the file selection window 30, together with the STORE button and the END button (S83). If one of the filenames on the pull-down menu is selected (S84), the attached file editing software 12 starts a new window, and displays the contents of the file identified by the selected filename, in the new window (S88).

If no filename is selected in step S84 and the STORE button in the pull-down menu is clicked (S85), the attached file editing software 12 stores the contents of the e-mail message shown in the edit box 103, to a temporary buffer (S89). If the STORE button is not clicked in step S85 and the END button is clicked (S86), the attached file editing software 12 closes the content confirmation window 100. If the judgement "NO" is given in step S82 or S86, or after any of steps S87, S88, and S89, the operation returns to step S81.

In this way, necessary data is automatically extracted from files and sent to each receiver. Here, link elements to image data files and audio data files, namely, image tags <IMG> and background sound tags <BGSOUND>, can be included in such data, so that not only character data but also image and audio data can be extracted and sent to each receiver.

The invention described above can be applied when delivering the minutes of a project meeting for new-product development to each project member, in such a way as to deliver the whole minutes to a project manager, and only relevant parts of the minutes to each of the other members. Especially for a large-scale project where a hierarchical staff structure is employed with a chain of commands decreasing with project managers, SE (system engineer) managers, and SEs, the invention can be applied in such a way as to deliver relevant parts of the minutes of a meeting which was attended only by the manager class to each SE, and the general outlines of the minutes to a company official who controls the project.

As another example where relevant data is different from one receiver to another, the invention can be applied to an editorial meeting of a magazine or the like, in such a way as to deliver relevant parts of the minutes to each assistant editor, the general outlines to a managing editor, and the whole minutes to a chief editor. Thus, according to the invention, each individual receiver can receive only data which is relevant to him or her.

Although the present invention has been described by way of the above embodiment, the invention should not be limited to such. For instance, the following modifications are possible.

(1) The files processed by the attached file editing software 12 were described as being written in HTML in the above embodiment, but they may instead be written in XML (extensible markup language). Also, the invention can be implemented even when the languages used by the word processing software 10, spreadsheet software 11, and mailer software 13 are different, so long as the attached file editing software 12 can process these languages.

The above embodiment describes the case where the attached file editing software 12 processes the HTML files directly. However, if the word processing software 10 or the like has an interface which accepts requests of editing and other operations, the attached file editing software 12 may request necessary operations through the interface. Such an interface can be constructed using known interface techniques, such as a command interface and function interface that use interprocess communication. With the provision of such an interface, the invention can be realized even when the language used by the word processing software 10 or the like cannot be processed by the attached file editing software 12.

(2) The attached file editing software 12 was described as being installed on the PC 2 in the above embodiment, though the effects of the invention can still be achieved when the attached file editing software 12 is installed on other mail terminals such as an EWS (engineering workstation).

(3) By installing a fax modem on the PC 2 and connecting it to a telephone network, and employing a filter for converting e-mail messages created by the attached file editing software 12 to fax format, documents made by the attached file editing software 12 can be sent not only to mail terminals but also to fax machines. Here, the effects of the invention can be achieved irrespective of the fax format (such as G3 or G4).

When sending data by fax, information on a subject, a receiver, and a sender, which is added to a header of an e-mail message, may be added to a header or footer of each page of the fax. Alternatively, the attached mail editing software 12 may automatically generate a fax header (the first page of the fax) and include the above information in the fax header.

(4) The invention may be the method described above, a device corresponding to the method, or a computer program that realizes the method on a computer. The invention may also be a computer-readable recording medium recording the computer program. Examples of the recording medium are a floppy disk, a hard disk, a CD-ROM, an MO, a DVD-ROM, a DVD-RAM, and a semiconductor memory.

The computer program may be transmitted via a network such as a telecommunication line, a radio or cable transmission line, or the Internet. Also, the computer program or digital signals which make up the computer program may be transferred using the recording medium or the network and executed on another computer system. Further, various combinations of the above embodiment and modifications are possible.

Thus, with the present invention, it is possible to extract necessary data from files for each individual receiver, attach the necessary data to an e-mail message, and send the e-mail messages to the corresponding receivers. As a result, each receiver receives only the data which is relevant to him or her. This saves the receiver from having to find necessary data from attached files.

In addition, only the necessary part of the files is sent rather than sending the whole files, so that the load of the network including the mail servers can be reduced.

(5) In the keyword selection window 40 of the above embodiment, more than one keyword may be associated with one mail address.

(6) The above embodiment describes the case where a paragraph or the like that contains a keyword is extracted from an HTML file, but this can be modified as follows. A paragraph number may be used as a keyword to indicate a paragraph to be extracted. Likewise, a column number or row number in a table may be used as a keyword to indicate a column or row to be extracted. Also, control characters maybe embedded in several parts of an HTML file and used to indicate data to be extracted. The effects of the invention can still be obtained by such indicating data to be extracted using a keyword corresponding the data.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A data processing method comprising:
accepting a keyword from a user;
accepting identification of a document file from the user;
accepting a mail address from the user;
searching the document file for the keyword;
extracting data corresponding to the keyword from the document file; and
attaching the extracted data to an e-mail message;
wherein the user sends the e-mail message to the mail address.

2. The data processing method of claim 1, wherein the data extracting step extracts data that includes the keyword, as the data corresponding to the keyword.

3. The data processing method of claim 1, wherein the data extracting step extracts a paragraph corresponding to the keyword, as the data corresponding to the keyword.

4. The data processing method of claim 3, wherein the document file is an HTML file, and the paragraph is data that begins after a paragraph start tag and ends before a paragraph end tag.

5. The data processing method of claim 1, wherein the data extracting step extracts a row corresponding to the keyword from a table included in the document file, as the data corresponding to the keyword.

6. The data processing method of claim 5, wherein the document file is an HTML file, and the row is data that begins after a table row start tag and ends before a table row end tag.

7. The data processing method of claim 1, wherein the data extracting step extracts a column corresponding to the keyword from a table included in the document file, as the data corresponding to the keyword.

8. The data processing method of claim 7, wherein the document file is an HTML file, and the column is made up of one or more sets of data that each begin after a table data cell start tag and end before a table data cell end tag.

9. The data processing method of claim 1, wherein the data extracting step extracts a cell corresponding to the keyword from a table included in the document file, as the data corresponding to the keyword.

10. The data processing method of claim 9, wherein the document file is an HTML file, and the cell is data that begins after a table data cell start tag and ends before a table data cell end tag.

11. The data processing method of claim 1, wherein the e-mail message is an HTML-format message.

12. A data processing method comprising:
accepting a keyword from a user;
accepting identification of a document file from the user;
accepting a mail address from the user, the mail address corresponding to the accepted keyword;
searching the document file for data that corresponds to the accepted keyword and corresponding mail address; and
extracting data that corresponds to the mail address from the document file;
wherein the user sends the extracted data via e-mail to the mail address.

13. A data processing method comprising:
accepting a keyword from a user;
accepting identification of a document file from the user;
accepting identification of a receiver of an e-mail message, the receiver being associated with the keyword;
searching the document file for the keyword;
extracting data corresponding to the keyword from the document file; and
attaching the extracted data to the e-mail message;
wherein the user sends the e-mail message to the receiver.

14. A data processing method comprising:
accepting a plurality of mail addresses from a user;
accepting a plurality of keywords from the user, wherein each keyword corresponds to a mail address;
accepting identification of a document file from the user;
searching the document file for a keyword;
extracting data corresponding to the keyword from the document file; and
attaching the extracted data to an e-mail message to be sent to the mail address corresponding to the keyword;
wherein the user sends the e-mail message.

15. A computer readable memory medium for storing a data processing program for executing the following steps on a computer processor:
accepting a keyword from a user;
accepting identification of a document file from the user;
accepting a mail address from the user;
searching the document file for the keyword;
extracting data corresponding to the keyword from the document file; and
attaching the extracted data to an e-mail message;
wherein the user sends the e-mail message to the mail address.

16. A data processing device comprising:
a keyword accepting unit which accepts a keyword from a user;
a document file accepting unit which accepts identification of a document file from the user;
a mail address accepting unit which accepts a mail address from the user;
a data extracting unit which searches the document file for the keyword and extracts data corresponding to the keyword from the document file; and
a data attaching unit which attaches the extracted data to an e-mail message;
wherein the user sends the e-mail message to the mail address.

17. The data processing method of claim 1, wherein the extracted data includes a part of a main body of the document file, and the part of the main body of the document file includes the keyword.

* * * * *